United States Patent

Takano

[11] Patent Number: 5,874,116
[45] Date of Patent: Feb. 23, 1999

[54] INJECTION MOLDING APPARATUS HAVING A DIVIDED DEGASSING PIN

[75] Inventor: Masuo Takano, Susono, Japan

[73] Assignee: Nanbu Plastic Co., Ltd., Yoshida-cho, Japan

[21] Appl. No.: 838,155

[22] Filed: Apr. 15, 1997

[30] Foreign Application Priority Data

Apr. 19, 1996 [JP] Japan ........................ 8-120798

[51] Int. Cl.⁶ .................................................. B29C 45/34
[52] U.S. Cl. .......................... 425/542; 264/102; 425/812
[58] Field of Search .................... 425/812, 130, 425/542; 264/102, 572

[56] References Cited

U.S. PATENT DOCUMENTS 5,092,759  3/1992  Lichtinger et al. ................ 425/812
5,439,370  8/1995  Lalaouna et al. .................. 425/812
5,626,887  5/1997  Chou et al. ........................ 425/812
5,665,281  9/1997  Drummond ........................ 425/812

Primary Examiner—Tim Heitbrink
Attorney, Agent, or Firm—Oliff & Berridge, PLC

[57] ABSTRACT

An injection molding apparatus for producing a molded form having a thin thickness portion through injection molding, comprising: a metal mold; a cavity formed in the metal mold for molding the molded form; a degassing hole formed in a portion of the metal mold corresponding to the thin thickness portion of the molded form; a degassing pin inserted in the degassing hole and fixed thereat, the degassing pin being longitudinally divided into at least two divisional parts; whereby gas in the cavity is forcedly exhausted not only through a first air gap between an inner surface of the degassing hole and an outside surface of the degassing pin but also through a second air gap in an abutment portion between the divisional parts of the degassing pin.

6 Claims, 6 Drawing Sheets

F I G. 4
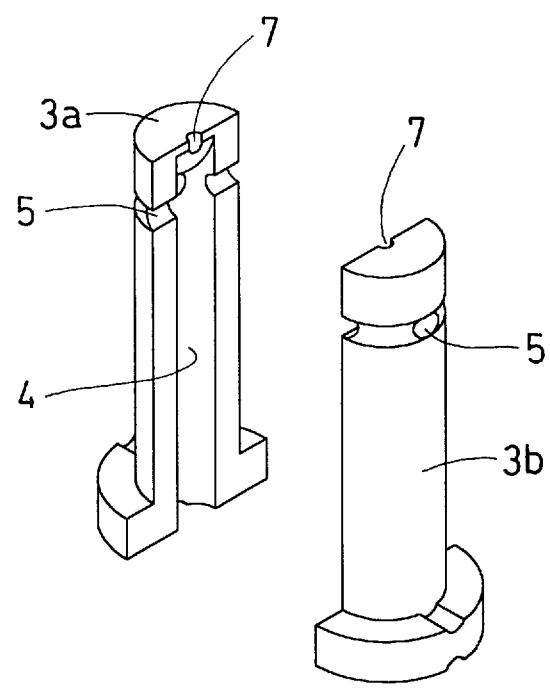

INJECTION MOLDING APPARATUS HAVING A DIVIDED DEGASSING PIN

BACKGROUND OF THE INVENTION

The present invention relates to an injection molding apparatus for producing molded forms having thin thickness portions by injection molding.

Generally, it is known to use an ultra-high speed injection machine in order to produce molded forms having thin thickness portions by injection molding. In this case, if gas is not discharged completely from a metal mold cavity at the time of injection molding, a short shot portion (not-filled portion) may be generated in a molded form. Accordingly, a clearance called a gasvent is formed in a metal mold as a counter measure against generation of such a short shot portion.

In such a ultra-high speed injection machine, although molten resin is injected at an ultra-high speed in the case where a molded form having a thin thickness portion is produced by injection molding, molten resin is hardened before gas in the mold cavity is completely exhausted through the clearance so that a short shot is unavoidably generated particularly in a thin thickness portion of the molder form. Although the hardening of the molten resin can be delayed if the metal mold is heated, it takes a long time for the injected molten resin before the molten resin is hardened so that the molded form cannot be taken out of the metal mold immediately to reduce the production efficiency.

Accordingly, it has been impossible to produce molded forms having thin thickness portions which are thinner than a predetermined value, while keeping high producing efficiency.

It is therefore an object of the present invention to solve the above problem to thereby provide an injection molding apparatus capable of producing molded forms having no short shot portions in their thin thickness potions.

SUMMARY OF THE INVENTION

In order to achieve the above object, according to an aspect of the present invention, provided is an injection molding apparatus for producing a molded form having a thin thickness portion through injection molding, comprising: a metal mold; a cavity formed in the metal mold for molding the molded form; a degassing hole formed in a portion of the metal mold corresponding to the thin thickness portion of the molded form; a degassing pin inserted in the degassing hole and fixed thereat, the degassing pin being longitudinally divided into at least two divisional parts; whereby gas in the cavity is forcedly exhausted not only through a first air gap between an inner surface of the degassing hole and an outside surface of the degassing pin but also through a second air gap in an abutment portion between the divisional parts of the degassing pin.

In the injection molding apparatus, preferably, a pin gate is formed in the metal mold so that molten resin injected from an external injection machine is injected into the cavity through the pin gate.

In the injection molding apparatus, preferably, the degassing pin is loosely inserted into the degassing hole and fixed there by means of a retaining member which is fixedly attached to the metal mold after the degassing pin is inserted into the degassing hole so that the retaining member prevents the degassing pin from coming off from the degassing hole, and wherein the degassing pin has a hollow portion formed in its inside so that the hollow portion is communicated with the cavity through the first and second air gaps and communicated with the outside of the metal mold through an opening formed in a bottom of the degassing pin and an opening formed in the retaining member.

In the injection molding apparatus, preferably, the degassing pin is screwed into the degassing hole so that the degassing pin is fixed to the metal mold so as not to come off from the degassing hole, the first air gap being formed in at least one of screw portions of the degassing pin and the degassing hole, and wherein the degassing pin has a hollow portion formed in its inside so that the hollow portion is communicated with the cavity through the first and second air gaps and communicated with the outside of the metal mold through an opening formed in a bottom of the degassing pin.

In the injection molding apparatus, preferably, a small hole is formed through a top end of the degassing pin so that the cavity and the hollow portion are communicated with each other through the small through hole.

In the injection molding apparatus, preferably, at least one through hole is formed through the degassing pin so that the first air gap and the hollow portion are communicated with each other through the at least one through hole.

BRIEF DESCRIPTION OF THE DRAWINGS

FIG. 4 is a perspective view showing the structure of another example of the degassing pin;

PREFERRED EMBODIMENTS OF THE INVENTION

Embodiments of the present invention will be described below with reference to the accompanying drawings.

Figure 1:
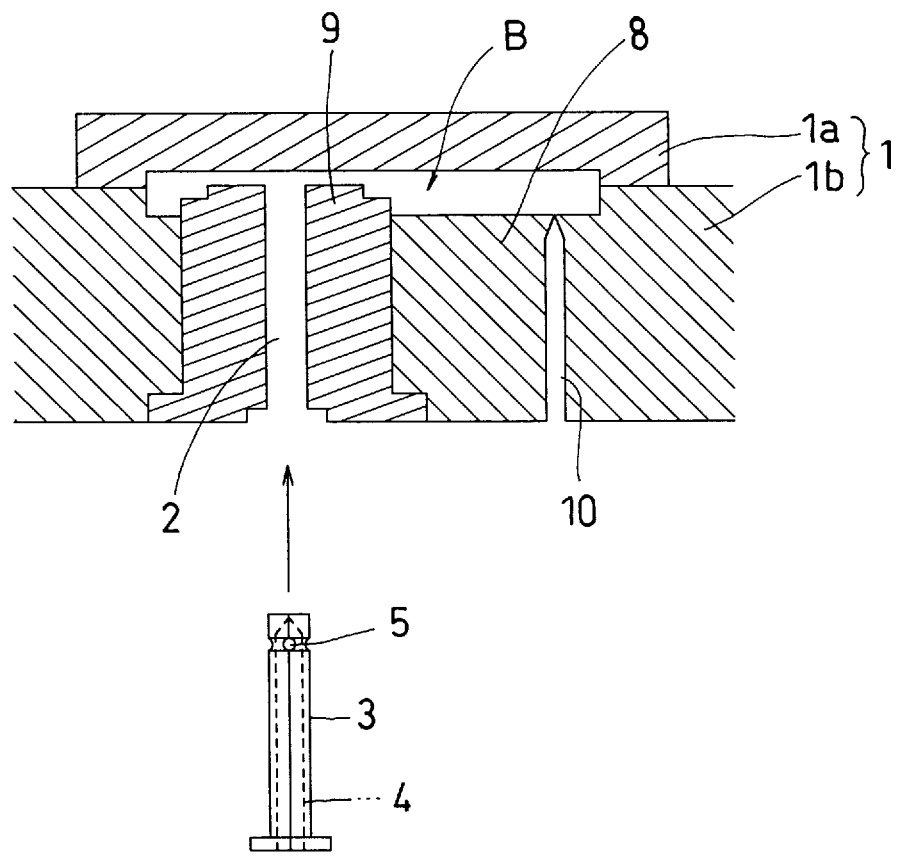
FIG. 1 a sectional view showing an example of a metal mold of an injection molding apparatus according to the present invention.
Figure 2:
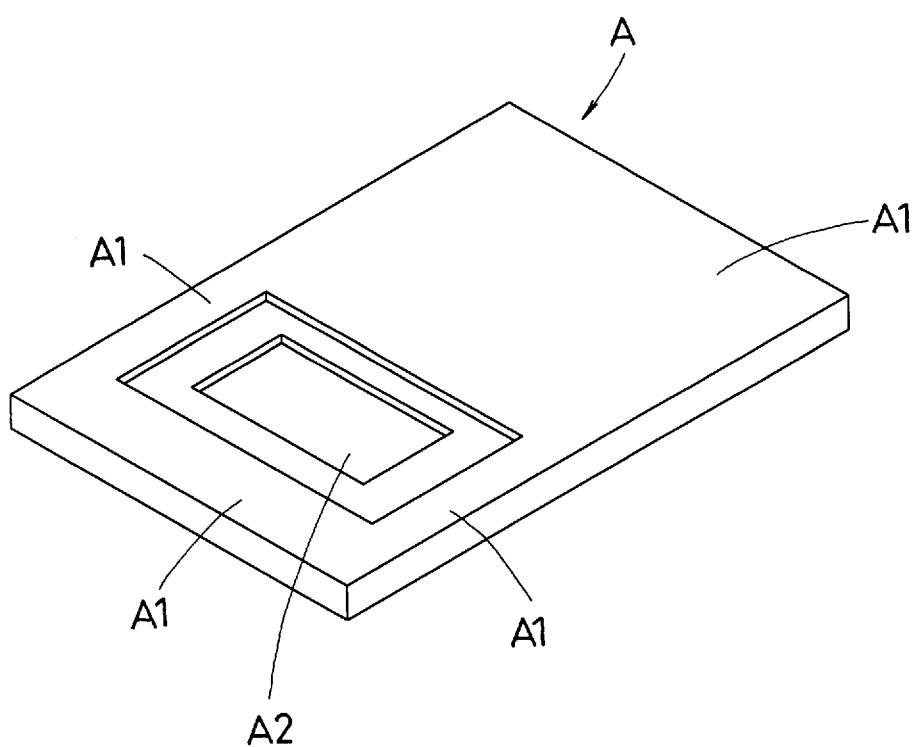
FIG. 2 is a perspective view showing a molded form produced by the injection molding apparatus of FIG. 1.

FIG. 1 is a sectional view showing an example of a metal mold to be set in a an injection molding apparatus. This metal mold 1 is used to produce a molded form A (see FIG. 2) having a thick portion A1 formed in a circumferential portion and a thin thickness portion A2 formed in a substantially central portion. The metal mold 1 is constituted by a male metal mold part 1a and a female metal mold part 1b.

The female metal mold 1b has a thin thickness forming portion 9 for forming a thin thickness portion of a molded form and a thick thickness forming portion 8 provided at the outer circumference of the thin thickness forming portion 9 for forming a thick portion of the molded form. In the female metal mold 1b, a circular cylindrical gassing hole 2 is formed in a substantially central position of the thin thickness forming portion 9. A cylindrical gassing pin 3 is loosely inserted into the degassing hole 2 and fixed thereat. The reference numeral 10 designates a pin gate which is connected to an injection machine (not shown) which injects molten resin at a ultra-high speed and at high pressure.

Figure 3:
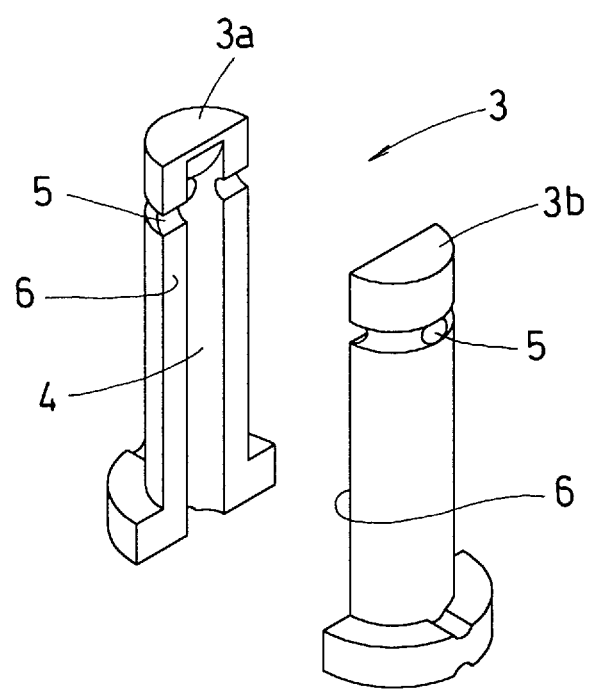
FIG. 3 is a perspective view showing the structure of a degassing pin.
Figure 6:
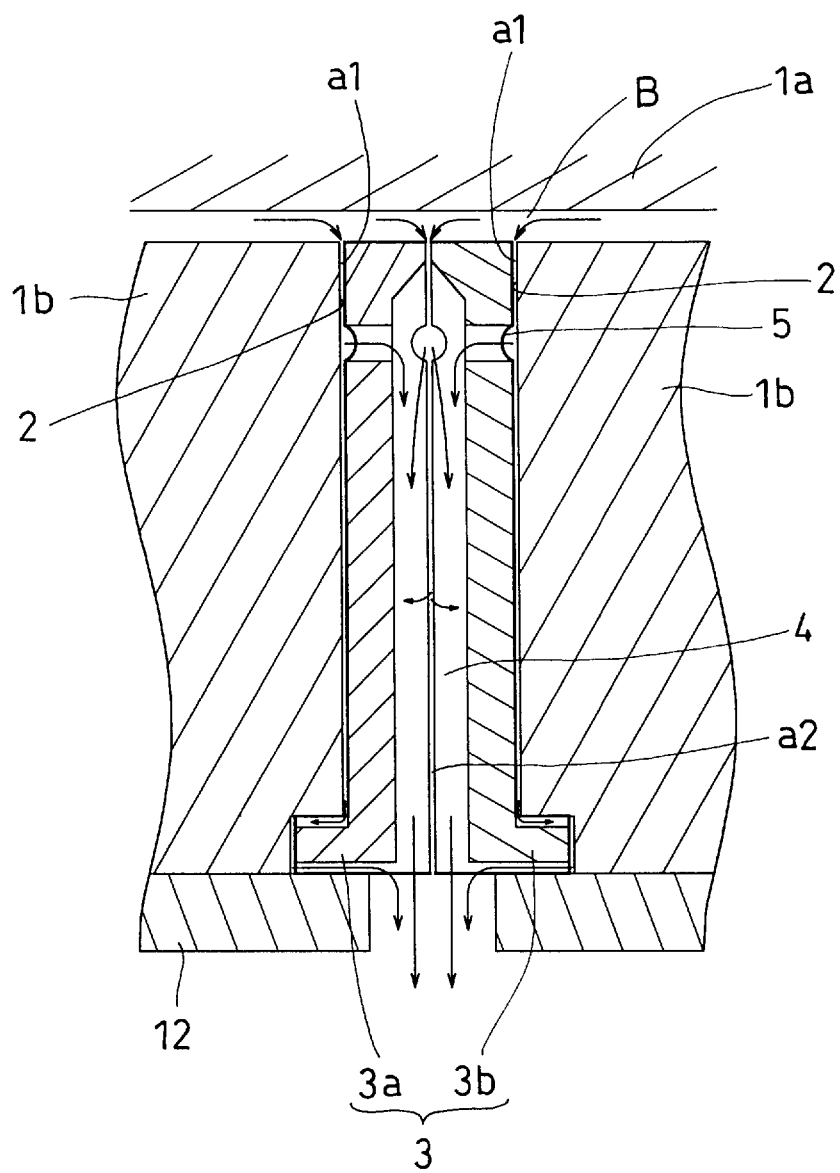
FIG. 6 is an enlarged sectional view showing the state of degassing.

The degassing pin 3 is designed so as to be longitudinally dividable into two parts 3a and 3b as shown in FIG. 3. The degassing pin 3 has an outer diameter which is smaller than an inner diameter of the degassing hole 2, and a hollow portion 4 which is formed inside the degassing pin 3 so as to be opened to the outside of the degassing pin 3. The hollow portion 4 is formed so as to communicate with a through hole 5 formed through a side wall of the degassing pin 3. The number of this through hole 5 is not limited to one (1), but a plurality of through holes may be formed. After inserted into the degassing hole 2 as shown in FIG. 6, the degassing pin 3 is fixed by means of a retaining member 12. Alternatively, the degassing pin 3 may be designed so as to be screwed into the degassing hole 2, and in this case, a degassing groove may be formed in a screw portion of the degassing hole 2 or the degassing pin 3.

Further, the dividing of the degassing pin 3 is not limited to halving, but the degassing pin 3 may be longitudinally divided into three parts or four parts. Further, as shown in FIG. 4, a small through hole 7 may be formed so as to penetrate a top portion of the degassing pin 3 at its center portion so as to make the hollow portion 4 communicate with the mold cavity through this small through hole 7.

In the thus configured injection molding apparatus, at the same time as molten resin is injected from the injection machine (not shown) through the pin gate 10, the gas inside the mold cavity B is exhausted by means of a vacuum pump (not shown) so that the molten resin flows from the outer circumference of the thin thickness forming portion 9 into its center portion after the molten resin has filled the thick thickness portion 8. If gas exists in the space between the thin thickness forming portion 9 and the male metal mold part 1a, this gas may be resistance against entering of the molten resin because the space of the thin thickness forming portion 9 is very narrow. However, since the gas in the mold B is exhausted to the outside partly through an air gap a1 between the inner wall surface of the degassing hole 2 and the outside surface of the degassing pin 3 and partly through the through hole 5, the molten resin can reach the air gap a1. Then, the molten resin further advances toward the center of the top surface of the degassing pin 3. Accordingly, if gas remains in this portion, this gas may be resistance against entering of the molten resin. However, since the gas remaining in the inside of the air gap a1 is exhausted to the outside through an air gap a2 between the respective abutment surfaces 6 and 6 of the divisional parts 3a and 3b of the degassing pin 3, no gas accumulation is generated at a top center portion of the degassing pin 3 so that the gas in the cavity B is exhausted completely. As a result, the molten resin is charged completely into the space of the thin thickness forming portion 9.

As described above, since the gas is exhausted not only through the air gap a1 between the degassing hole 2 and the degassing pin 3 but also through the air gap a2 at the joint portion of the longitudinally halved degassing pin 3, no gas accumulation is generated in the top center portion of the degassing pin 3 so that the gas in the cavity B can be exhausted completely to make the cavity B be filled with the molten resin with no fear of generation of a short shot portion in a thin thickness portion of a molded form.

According to the above injection molding apparatus, it was confirmed that a molded form having a thin thick portion of about 0.1 mm. It was impossible conventionally to obtain such a thin thickness.

Figure 5:
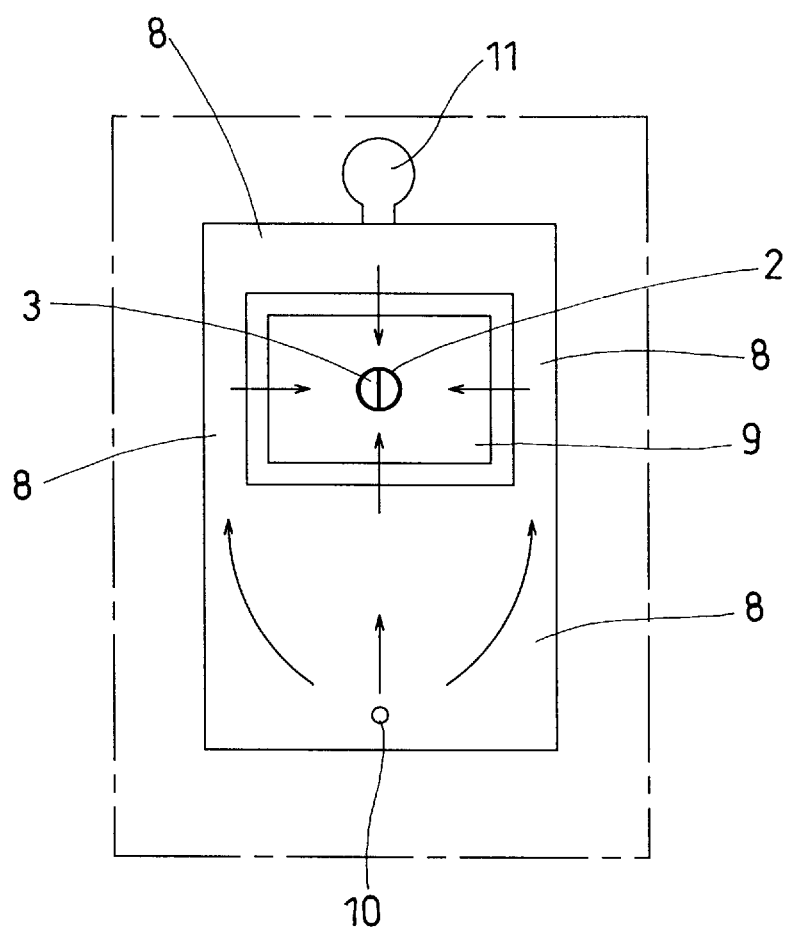
FIG. 5 is a plan view of a female metal mold part showing the flow of molten resin.

Alternatively, as shown in FIG. 5, a resin reservoir 11 is formed as a well portion which is connected to the thick thickness portion 8 in a place where portions of the molten resin injected from the pin gate 10 and made a detour to avoid the thin thickness portion 9 come to join with each other so that degassing is made in two places, that is, in the degassing hole 2 and the resin reservoir 11. The degassing in the resin reservoir 11 is not always necessary.

In the above description with respect to the injection molding apparatus, although the case where the degassing hole formed in the female metal mold is made cylindrical is illustrated, the degassing hole is not limited to such a cylindrical shape but it may be formed to be rectangular in section and the degassing pin may be formed into a rectangular pillar with a hollow portion in the inside thereof. Also in this case, the rectangular pillar degassing pin is longitudinally divided into two similarly to the above-mentioned case.

According to the present invention, since the degassing pin inserted and fixed in the degassing hole in the metal mold is longitudinally divided, the gas in the cavity is exhausted not only through the air gap between the inner wall surface of the degassing hole and the outside surface of the degassing pin but also through the air gap formed at the abutment portion between the divisional parts of the degassing pin, no gas accumulation is generated at the top center portion of the degassing pin and the gas in the mold cavity can be exhausted completely in a short time. Accordingly, it is possible to produce molded forms having thin thickness portions with no short shot portions.

What is claimed is:

1. An injection molding apparatus for producing a molded form having a thin thickness portion through injection molding, comprising:

a metal mold;

a cavity formed in said metal mold for molding the molded form;

a degassing hole formed in a portion of said metal mold corresponding to the thin thickness portion of the molded form;

a degassing pin inserted in said degassing hole and fixed thereat, said degassing pin being longitudinally divided into at least two divisional parts; whereby gas in said cavity is forcedly exhausted not only through a first air gap between an inner surface of said degassing hole and an outside surface of said degassing pin but also through a second air gap in an abutment portion between the divisional parts of said degassing pin.

2. An injection molding apparatus according to claim 1, wherein a pin gate is formed in said metal mold so that molten resin injected from an external injection machine is injected into said cavity through said pin gate.

3. An injection molding apparatus according to claim 1, wherein said degassing pin is loosely inserted into said degassing hole and fixed there by a retaining member which is fixedly attached to said metal mold after said degassing pin is inserted into said degassing hole so that said retaining member prevents said degassing pin from coming off from said degassing hole, and wherein said degassing pin has a hollow portion formed therein so that said hollow portion is communicated with said cavity through said first and second air gaps and communicated with the outside of said metal mold through an opening formed in a bottom of said degassing pin and an opening formed in said retaining member.

4. An injection molding apparatus according to claim 1, wherein said degassing pin is screwed into said degassing hole so that said degassing pin is fixed to said metal mold so as not to come off from said degassing hole, said first air gap being formed in at least one screw portion of said degassing pin and said degassing hole, and wherein said degassing pin has a hollow portion formed in its inside so that said hollow portion is communicated with said cavity through said first and second air gaps and communicated with the outside of said metal mold through an opening formed in a bottom of said degassing pin.

5. An injection molding apparatus according to claim 3, wherein a small through hole is formed through a top end of said degassing pin so that said cavity and said hollow portion are communicated with each other through said small through hole.

6. An injection molding apparatus according to claim 3, wherein at least one through hole is formed in said degassing pin so that said first air gap and said hollow portion are communicated with each other through said at least one through hole.

\* \* \* \* \*